(12) United States Patent
Dedek

(10) Patent No.: US 10,781,503 B2
(45) Date of Patent: Sep. 22, 2020

(54) METHOD FOR THE REMOVAL AND RECOVERY OF METALS AND PRECIOUS METALS FROM SUBSTRATES

(76) Inventor: Petr Dedek, Prague (CZ)

( * ) Notice: Subject to any disclaimer, the term of this patent is extended or adjusted under 35 U.S.C. 154(b) by 378 days.

(21) Appl. No.: 14/241,105

(22) PCT Filed: Aug. 29, 2012

(86) PCT No.: PCT/EP2012/003622
§ 371 (c)(1),
(2), (4) Date: Feb. 26, 2014

(87) PCT Pub. No.: WO2013/029785
PCT Pub. Date: Mar. 7, 2013

(65) Prior Publication Data
US 2014/0165786 A1    Jun. 19, 2014

Related U.S. Application Data

(60) Provisional application No. 61/575,976, filed on Sep. 1, 2011.

(51) Int. Cl.
| | | |
|---|---|---|
| C22B 3/00 | (2006.01) | |
| C22B 3/24 | (2006.01) | |
| C23F 1/30 | (2006.01) | |
| C23F 1/44 | (2006.01) | |
| C22B 3/16 | (2006.01) | |

(52) U.S. Cl.
CPC .............. *C22B 11/042* (2013.01); *C22B 3/16* (2013.01); *C22B 3/24* (2013.01); *C22B 11/046* (2013.01); *C23F 1/30* (2013.01); *C23F 1/44* (2013.01); *Y02P 10/214* (2015.11); *Y02P 10/234* (2015.11)

(58) Field of Classification Search
CPC ....... C22B 3/24; C22B 11/046; C22B 11/044; C23F 1/30; C23F 1/44
USPC ..................................................... 75/715, 721
See application file for complete search history.

(56) References Cited

U.S. PATENT DOCUMENTS

| | | | |
|---|---|---|---|
| 3,957,505 A * | 5/1976 | Homick et al. ................. | 75/720 |
| 4,302,246 A | 11/1981 | Brindisi, Jr. et al. | |
| 4,746,369 A | 5/1988 | Sullivan et al. | |
| 5,512,201 A | 4/1996 | Singh et al. | |
| 2008/0116170 A1* | 5/2008 | Collins ............. | H01L 21/32134 216/87 |

(Continued)

OTHER PUBLICATIONS

International Search Report dated Dec. 4, 2012 for International Application No. PCT/EP2012/003622.

(Continued)

*Primary Examiner* — Tima M. McGuthry-Banks

(57) ABSTRACT

The invention relates to a method for removing metal and/or precious metal-containing depositions from substrates. The substrate is subjected to treatment with an organo amine protectant component P and an inorganic active component A. Component P may be formed in situ by reaction with component R. Component P is an organic amine and/or organic amine hydrochloride. Component A is an inorganic compound and component R is an organic compound that can be split along the C—N bond by the component A into an organic amine. The metals in the form of organo-metallic complexes can be isolated and/or separated by means of different chemical reactions and/or biosorption.

2 Claims, 18 Drawing Sheets

(56) References Cited

U.S. PATENT DOCUMENTS

2014/0147353 A1* 5/2014 Lin et al. ............... 423/22
2015/0090075 A1* 4/2015 Dedek .............. C22B 3/24
                                                75/403

OTHER PUBLICATIONS

Wang et al., Biosorption of heavy metals by *Saccharomyces cerevisiae*: A review, Biotechnology Advances, vol. 24, pp. 427-451, 2006.
Nilanjana Das, Recovery of precious metals through biosorption—A review, Hydrometallurgy, vol. 103, pp. 180-189, 2010.
Mack et al., Biosorption of precious metals, Biotechnology Advances, vol. 25, pp. 264-271, 2007.
Nováková Markéta, Bachelor's thesis, Využití kvasinky *Saccharomyces cerevisiae* pro studium proteinových interakcí, Masarykova Univerzita, Brno, 2010.

* cited by examiner

METHOD FOR THE REMOVAL AND RECOVERY OF METALS AND PRECIOUS METALS FROM SUBSTRATES

CROSS-REFERENCE TO RELATED APPLICATIONS

This application is a National Phase Application of PCT International Application No. PCT/EP2012/003622, International Filing Date Aug. 29, 2012, claiming the benefit of U.S. Provisional Application No. 61/575,976, filed Sep. 1, 2011, which is hereby incorporated by reference.

FIELD OF THE INVENTION

Traditionally it has been a challenge to remove thick and or multiple layers of depositions of metals and precious metals from various types of substrates. Current methods typically involve manually or mechanically removing depositions, including precious metal layers, which can damage substrates. Other methods can include the use of aggressive or poisonous chemicals to remove the precious metals that can also damage or destroy the substrate or that may not remove the entire deposition from the substrate. Therefore, it was desirable to develop a chemical method to remove layers of depositions, including precious metals, form various types of substrates.

Traditionally, separating different precious metals and metals has been a challenging if not impossible task. This has led to the loss of precious metals due to the lack of a viable method to separate then once they have been chemically changed from a metal to a compound in solution. Therefore, it was desirable to develop a chemical method to selectively remove metals and precious metals from a solution. Selective biomass sorption of metals and precious metals has been studied in the prior art. Hydrometallurgy 2010, 103, 180-189. Nilanjana, D.; Recovery of Precious Metals Through Biosorption, deals with biosorption in recovery of precious metals from aqueous solutions. The metal binding mechanism, as well as the parameters influencing the uptake of precious metals and isotherm modeling, is presented. Biotechnology Advances 2007, 25, 264-271, Mack, C.: Wilhelmi, B. Duncan, J. R., Burgess, J. E.; Biosorption of Precious Metals, reviews recent research regarding the biosorption of some precious metals, with emphasis on the effects of the biosorption environment and the biosorption mechanism identified. Biotechnology Advances 2006, 24, 427-451. Wang, J., Chen, C.; Biosorption of Heavy Metals by *Saccharomyces cerevisae*: A Review, elucidates the mechanism of metal uptake. Various mechanism assumptions of metal uptake by *S. cerevisiae* are summarized. Kvasinky, Bachelor's thesis, Marketa Novakova, 2010, deals with *Saccharomyces cerevisiae*, and summarizes cell biological study, and its genome, reproduction, growth conditions, and metabolism.

STATEMENT OF THE INVENTION

This invention concerns use of organo amines, to protect a substrate from damage during the removal of a deposition consisting of one or more layers of metal and/or precious metals adhered to the substrate. Once in solution, it is disclosed in this invention to use certain types of reduction methods and/or biomass materials to extract and separate the different types of metals and/or precious metals. The use of inorganic nitrogen compounds is also contemplated for use with the present invention.

The invention provides a method to remove depositions, including metals and precious metals such as gold and/or platinum and/or titanium, from a substrate without damaging the substrate and/or efficiently extract it from different substrates.

The invention would be a suitable replacement for aqua regia, a known powerful acid traditionally used to recovery gold and platinum. Additionally, the invention provides a method for the removal/extraction/separation of metals and precious metals from different abrasive blasting media and from solutions of mixtures of metals and precious metals, from ores, and from other sources.

The invention will allow for the recovery of gold, platinum and other metals and precious metals utilizing a chemical method of stripping, separation, and purification from different substrates that results in high yields and purity while preserving the substrates. The invention may be used either in a batch process for treatment of discrete materials with coatings or in a continuous process for materials in long rolls. The invention has the potential to offer "green technology" by allowing the recovery and recycling of substrates, especially polymeric substrates that are normally destroyed when recovering precious metals and by avoiding the use of poisonous chemicals (cyanides for instance) while extracting gold and platinum from ores.

The invention consists of two chemical constituents: a PROTECTANT "P" and an ACTIVE chemical "A" that function to remove a layer and/or multiple layers of depositions, including metals and/or precious metals, from various types of substrates while not damaging the substrate. PROTECTANT agent "P" functions in the reaction as a surface protectant for the substrate. Additionally, PROTECTANT agent "P" can function as a COMPLEXING agent "C" with metals that are oxidized and/or form other metal compounds. The PROTECTANT agent "P" may be added to the reaction directly or created in situ by the chemical reaction between REAGENT "R" and the ACTIVE chemical "A". Since the PROTECTANT agent "P" protects the surface of the substrate, it allows the ACTIVE chemical "A" to be a chemical or mixture of chemicals (such as aqua regia) that would otherwise damage the substrate while dissolving or separating the precious metals from the substrate.

It has turned out that the protectant function according to the invention is best performed by mono-, di- and tri-substituted amines and/or their hydrochlorides, wherein each substituent is independently an alkyl or a cycloalkyl. The term "alkyl" as used herein means an aliphatic linear or branched group having 1 to 18 carbon atoms. The term "cycloalkyl" herein means a cyclic aliphatic group having 3 to 8 carbon atoms.

Examples of surface PROTECTANT "P"/COMPLEXING agent "C" chemical include the organo-amines such as trimethylamine hydrochloride $((CH_3)_3N.HCl)$, dimethylamine hydrochloride $((CH_3)_2NH.HCl)$, methylamine hydrochloride $(CH_3NH_2HCl)$, triethylamine hydrochloride $((CH_3CH_2)_3N.HCl)$, dimethylamine hydrochloride $((CH_3CH_2)_2NH.HCl)$, methylamine hydrochloride $(CH_3CH_2NH_2.HCl)$, cyclohexylamine hydrochloride $(C_6H_{11}NH_2.HCl)$, dicyclohexylamine hydrochloride $((C_6H_{11})_2NH.HCl)$, N,N-dimethylcyclohexylamine hydrochloride $(C_6H_{11}N(CH_3)_2.HCl)$, diisopropylamine hydrochloride $((CH_3)_2CHNHCH(CH_3)_2.HCl)$, N-ethylcyclohexylamine hydrochloride $(C_6H_{11}NC_2H_5.HCl)$, N-methylcyclohexylamine hydrochloride $(C_6H_{11}NCH_3.HCl)$, etc.

Examples of REACTIVE "R" surface protectant/COMPLEXING "C" agents that can form amines in situ include dimethylformamide (DMF)—$C_3H_7NO$) and N-methyl pyrrolidone (NMP)—$C_5H_9NO$, and other organic compounds (such as amides and/or lactams) that can be split along the C—N bond into an amine and other organic compound (such as dimethylamine and formic acid in case of DMF).

Examples of ACTIVE chemical "A" include inorganic acids and mixtures thereof from the group consisting of nitric acid ($HNO_3$) and/or hydrofluoric acid (HF), and/or hydrochloric acid (HCl) and/or phosphoric acid ($H_3PO_4$), and/or fluorosilicic acid ($H_2SiF_6$), and/or ammonium peroxydisulfate (($NH_4)_2S_2O_8$), and/or sulfuric acid ($H_2SO_4$), and other inorganic compounds that can cause splitting organic compounds (such as amides and/or lactams) along the C—N bond into organic amine(s) and other organic compounds and/or can dissociate any amine hydrochloride into the PROTECTANT "P" and COMPLEXING agent "C" to allow its dual action (protecting and complexing).

Examples of substrates include aluminum, copper, steel, stainless steel, glass, titanium, their alloys, graphite, carbon fibre, ceramic, fused silica, quartz, blasting media (such as corundum, sand, corn cob, plastic abrasives, silicon carbide, pumice, steel grit, steel shot, walnut shells, soda, and glass beads), polymers (such as PEEK, PET, polyimide, polyether, etc.) and ores.

The following equations illustrate the two chemical reaction mechanisms:

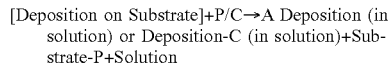
[Deposition on Substrate]+P/C→A Deposition (in solution) or Deposition-C (in solution)+Substrate-P+Solution

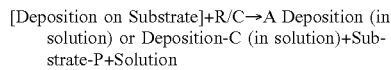
[Deposition on Substrate]+R/C→A Deposition (in solution) or Deposition-C (in solution)+Substrate-P+Solution where Deposition=one or more selected from Be, Mg, Ca, Ti, Zr, V, Nb, Ta, Cr, Mo, W, Mn, Fe, Ni, Pd, Pt, Cu, Ag, Au, Zn, Cd, B, Al, Ga, In, Tl, C, Si, Sn, N, P, As, S, Se, Te, and their mixtures, and/or their chemical compounds.

Once the depositions have been separated from the substrate and dissolved and/or extracted into solution, separating the different precious metals has traditionally been a challenging if not impossible task. One method to remove metals from solution is the use of biomass materials to selectively biosorb reaction products that were originated in situ by chemical reactions between the deposition and/or "P" and/or "R" and/or "A". The use of biomass materials allows one to reclaim metals and/or precious metals that would have otherwise been difficult and/or unsafe to separate. Specifically, certain types of biomass materials are able to bind and concentrate metals from aqueous solutions. A biosorption-based process offers a number of advantages including low cost, selective metal reclamation, high efficiency in metal complexation and high purity of the final metal.

This invention consists of using selected biosorbants to recover metals and/or precious metals and/or their chemical compounds. Examples of selective biosorbants include seaweed (ie *Spirulina platensis*) and yeast (i.e. *Saccharomyces cerevisiae*).

The following equations illustrate the selective chemical reaction mechanisms:

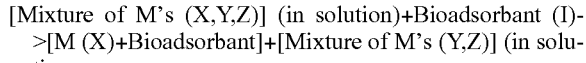
[Mixture of M's (X,Y,Z)] (in solution)+Bioadsorbant (I)->[M (X)+Bioadsorbant]+[Mixture of M's (Y,Z)] (in solution

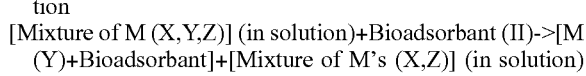
[Mixture of M (X,Y,Z)] (in solution)+Bioadsorbant (II)->[M (Y)+Bioadsorbant]+[Mixture of M's (X,Z)] (in solution)

where M=Metals and/or Precious Metals and/or their chemical compounds X,Y,Z=Mixture of Metals and/or Precious Metals and/or their chemical compounds The following FIGURES and EXAMPLES illustrate the invention.

Figure 1:
FIG. 1 depicts an apparatus for recovering gold from a PET substrate. The PET substrate is provided in spooled rolls.
Figure 2:
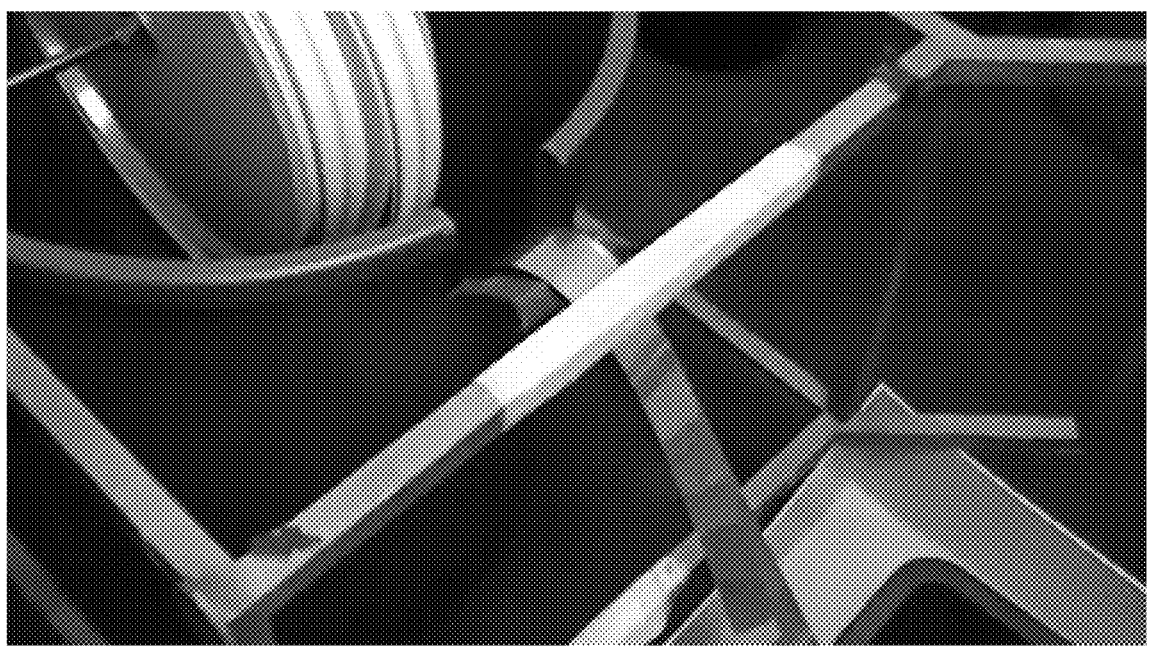
As shown in FIG. 2, the gold-hued PET is fed from the roll to a first station where it is soaked in a cleaning solution that was made in accordance with the teachings of the present invention.
Figure 3:
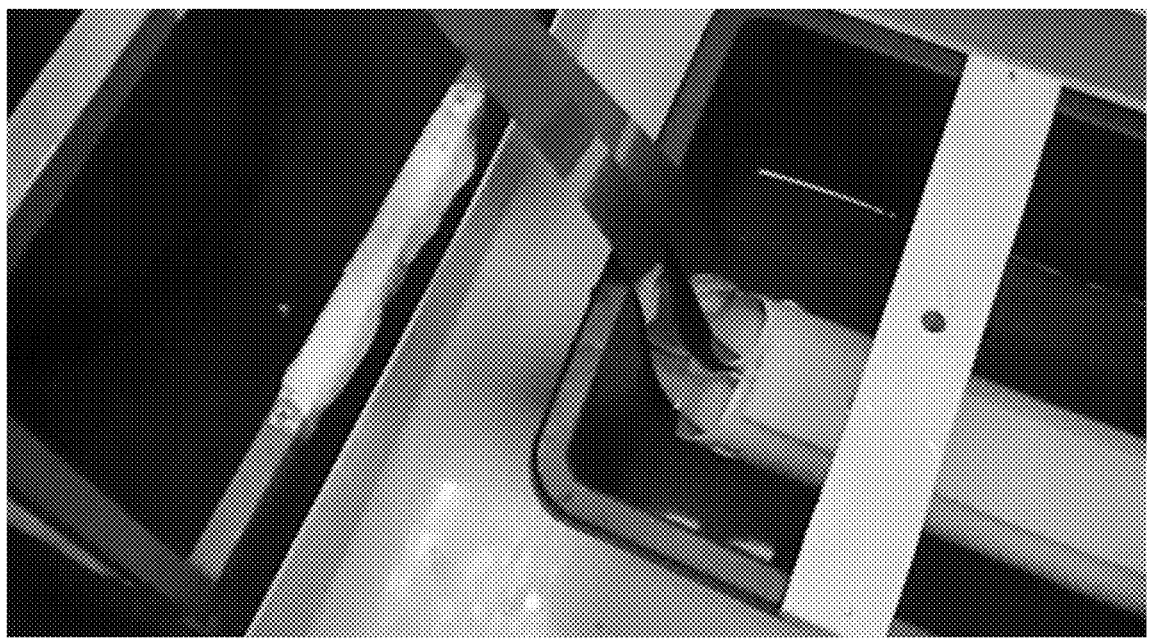

See FIG. 3.

Figure 4:
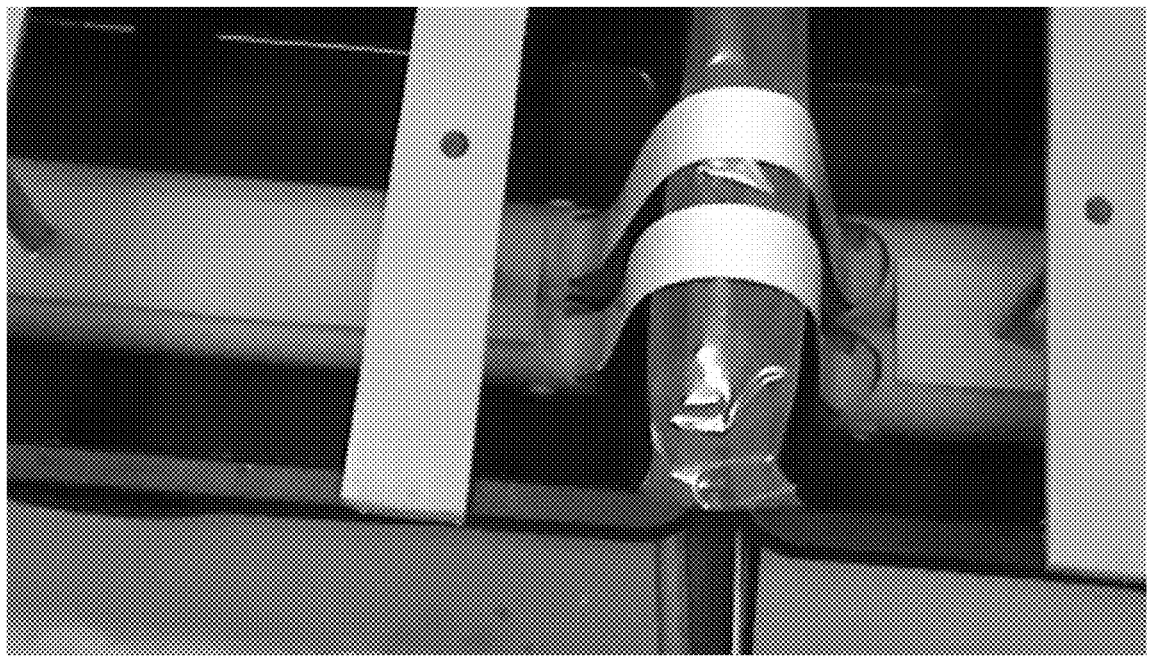

In FIG. 4, the substrate is passed from the first station to a second station that is filled with water. By passing the substrate through the second station, the majority of the solution from the first station is removed.

Figure 5:
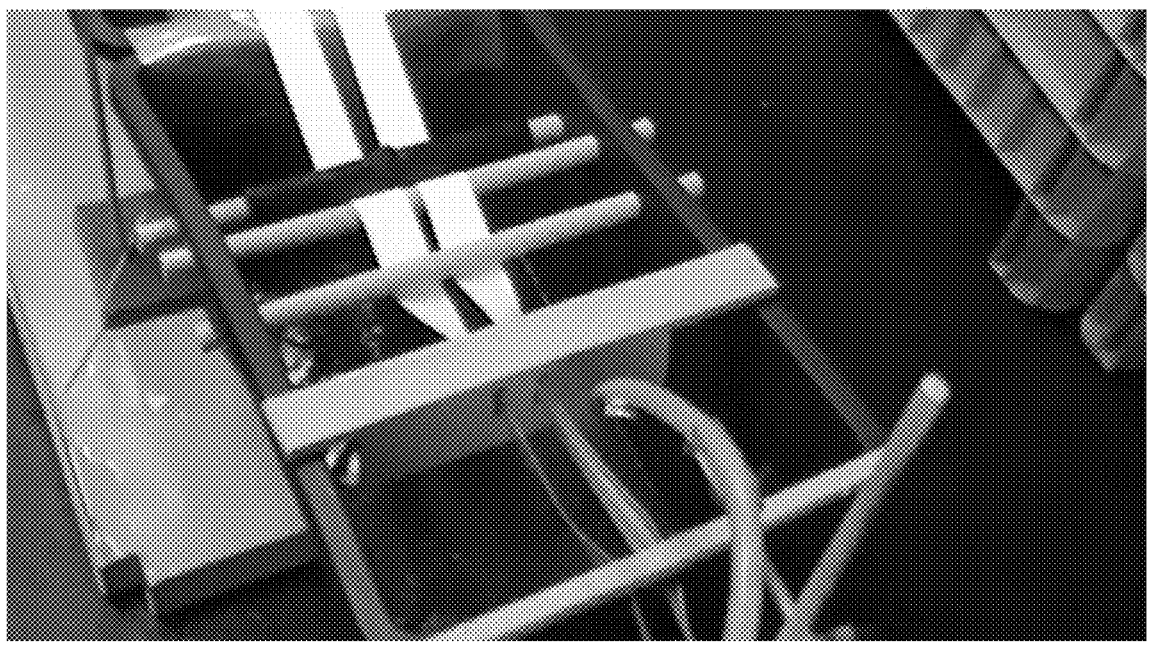

In FIG. 5, the substrate is passed through a series of rollers to remove the rest of the cleaning solution and subsequently passed through a water mist. The liquids from all stations are subjected to a gold recovery process including reduction.

Figure 6:
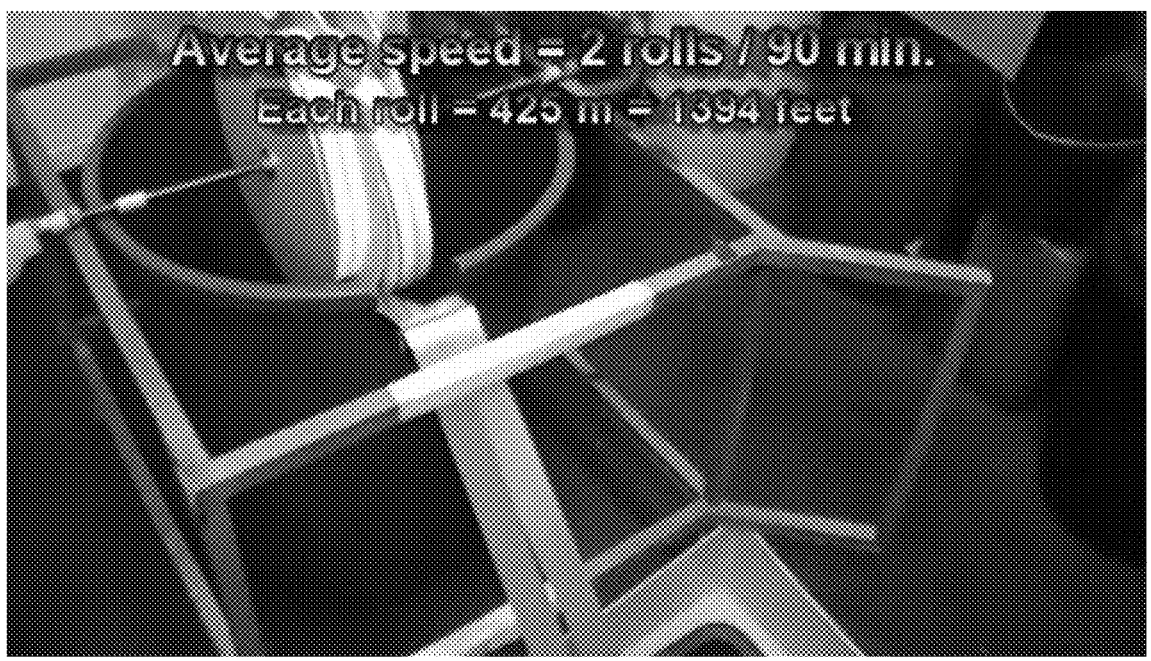

As illustrated in FIG. 6, the illustrated rolls are 425 meters long and two such rolls can be processed in approximately 90 minutes in the illustrated continuous process.

Figure 7:
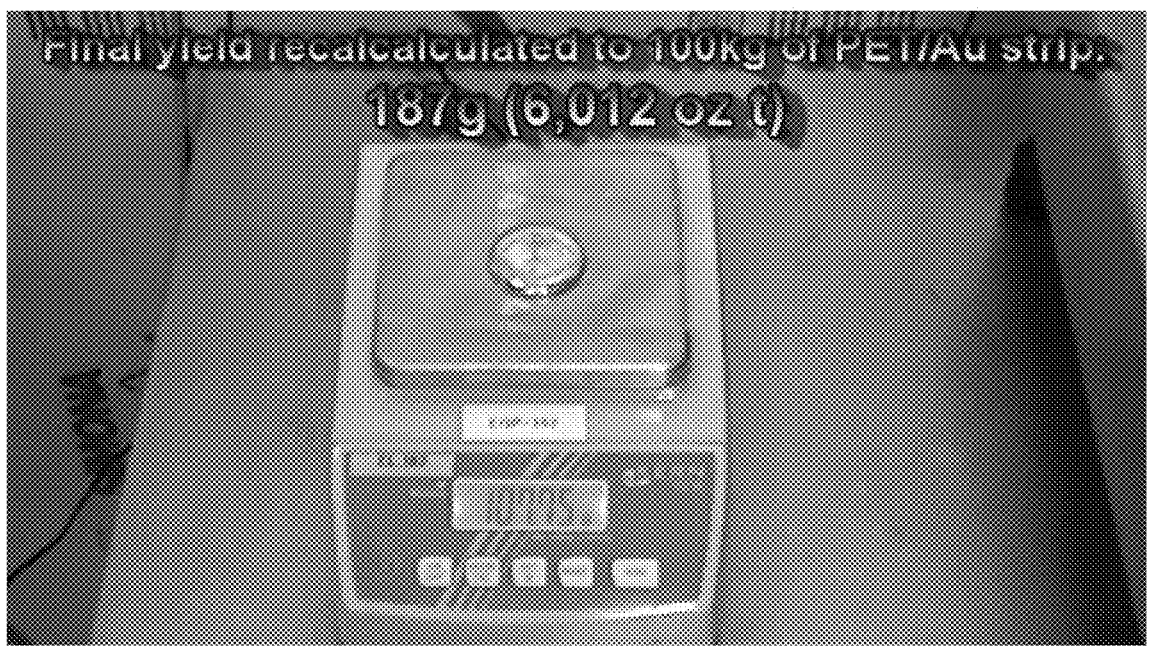

As shown in FIG. 7, approximately 187 g of gold are recovered for every 100 kg of the PET substrate.

Figure 8:

FIG. 8 illustrates a batch process for cleaning a substrate and recovering the gold plating. Gold-plated substrates are soaked in a cleaning solution that was made in accordance with the teachings of the present invention. Before submersions, the sheets have a metallic hue.

Figure 9:

As shown in FIG. 9, after briefly soaking the substrate, the metallic hue is gone and the substrate is white.

Figure 10:

FIG. 10 provides a depiction of one submerged substrate (white) and one pre-treated substrate (metallic).

Figure 11:

As shown in FIG. 11, after soaking, the residual cleaning solution is removed from the substrate by rising with water.

Figure 12:
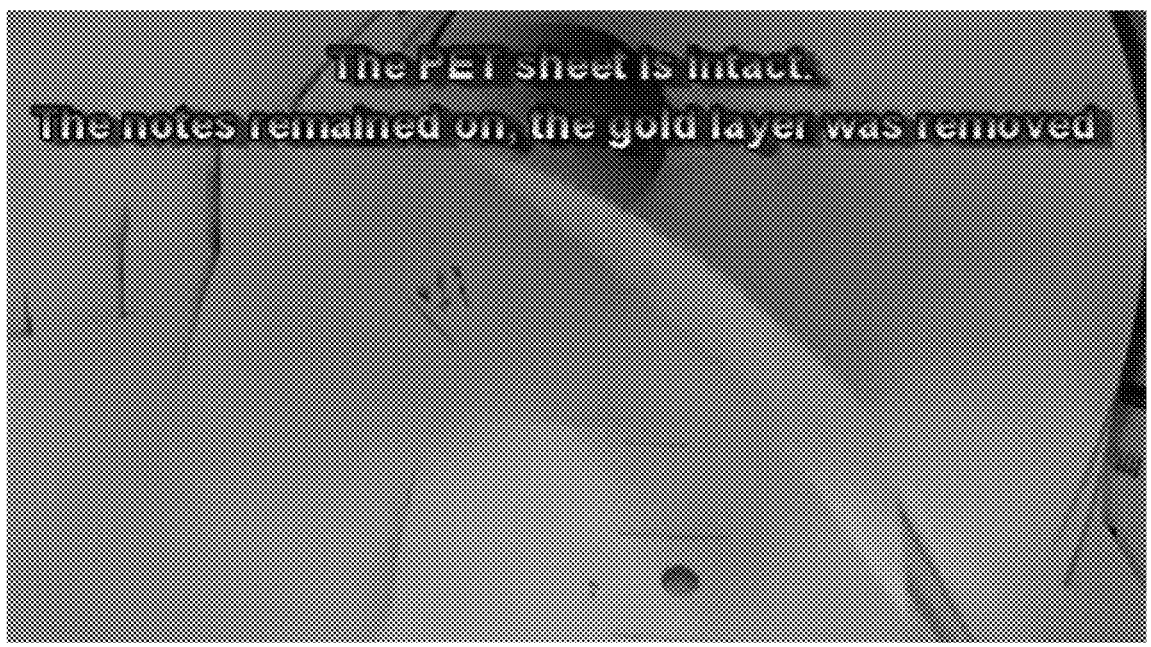

FIG. 12 depicts the cleaned, white substrate. The gold layer was removed without damaging the substrate, including notes that were written on the substrate.

Figure 13:
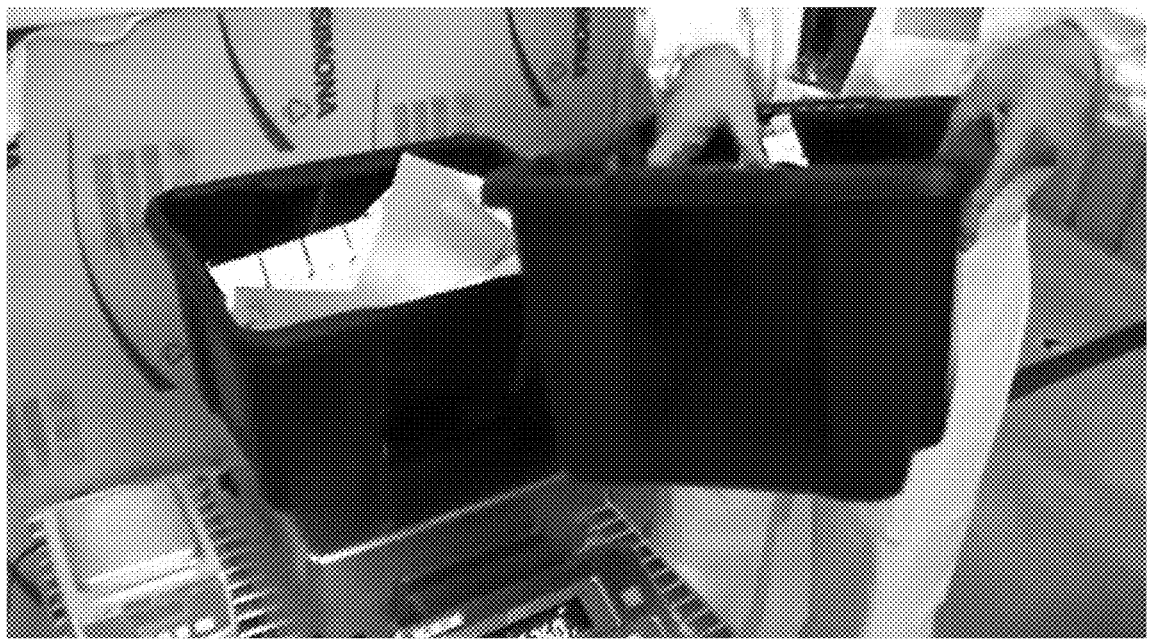

FIG. 13 provides another depiction of the metallic substrate prior to treatment.

Figure 14:
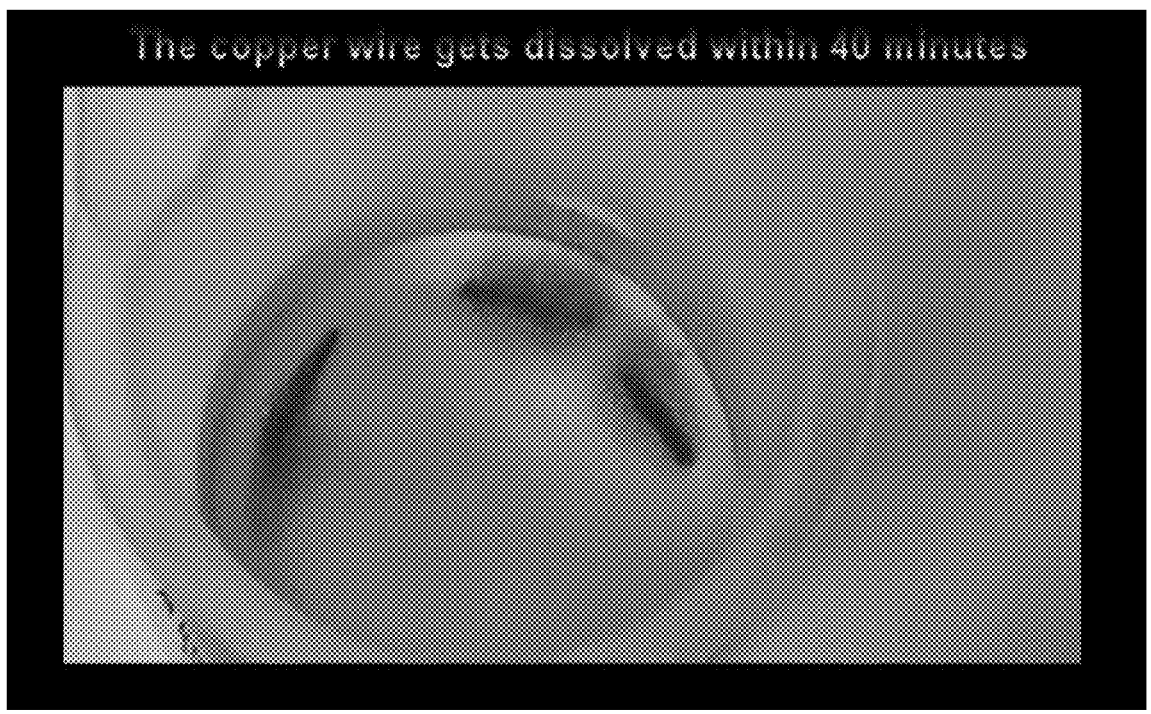

FIG. 14 depicts an aqua regia solution dissolving a copper substrate. The copper wire gets dissolved within 40 minutes.

Figure 15:
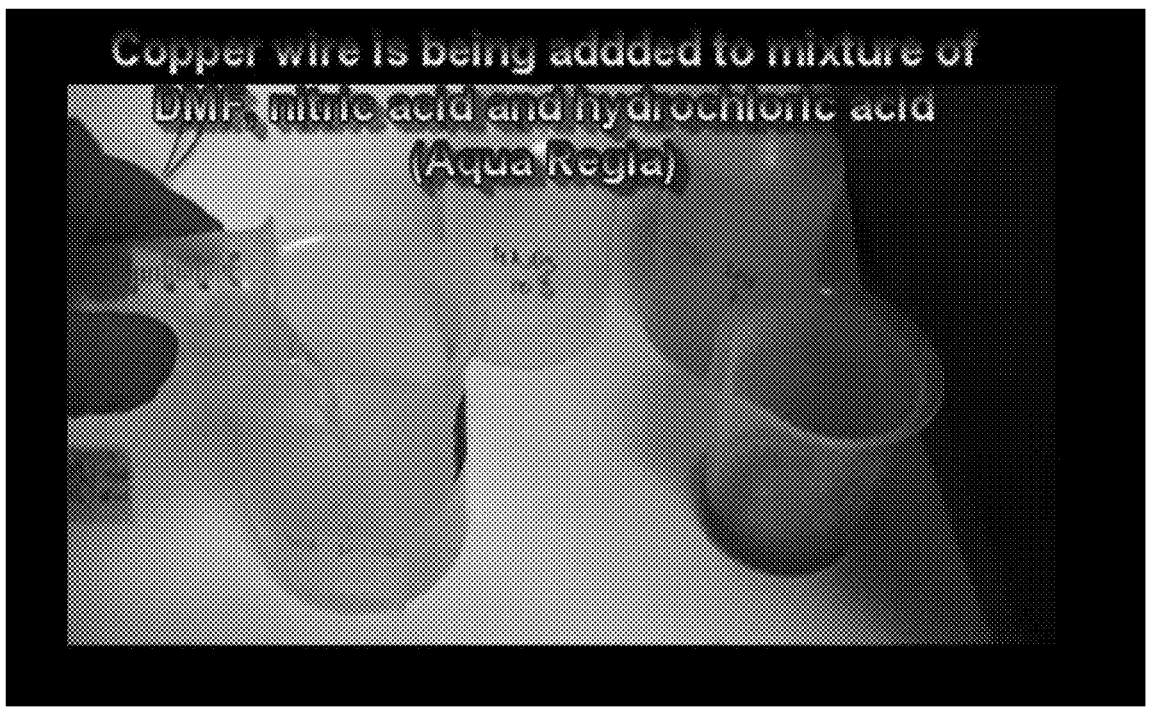
Figure 16:

FIG. 15 illustrates the addition of DMF to the aqua regia solution and the subsequent inability of the DMF solution to rapidly dissolve the copper wire (FIG. 16). The copper wire stays intact long enough until the aqua regia dissolves a possible deposition.

Figure 17:

FIG. 17 depicts a copper part plated with gold, platinum and titanium. After two days of soaking in the inventive cleaning solution followed by brush cleaning, the majority of the metal layer was removed without damaging the copper.

Figure 18:
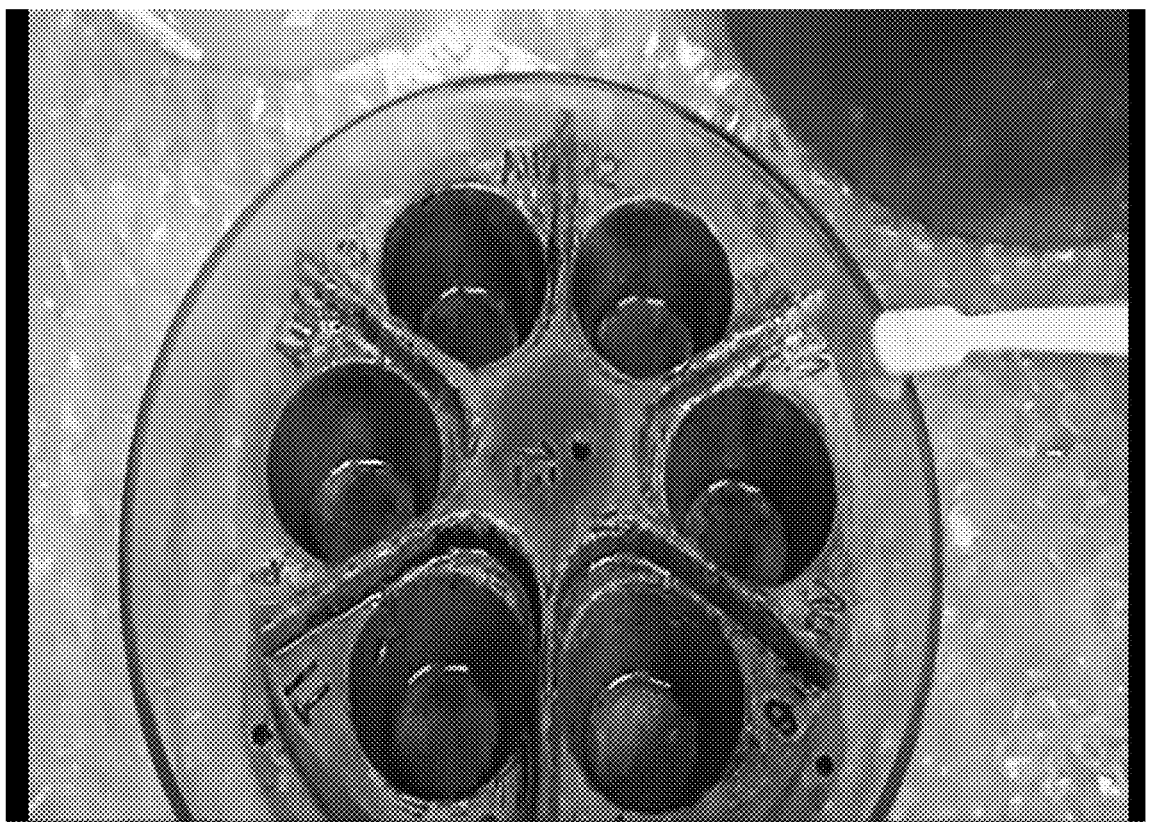
Figure 19:

See FIGS. 18 and 19. The copper part is intact, i.e. the aqua regia selectively etched the deposition only, while DMF served as surface protectant.

Figure 20:
Figure 21:
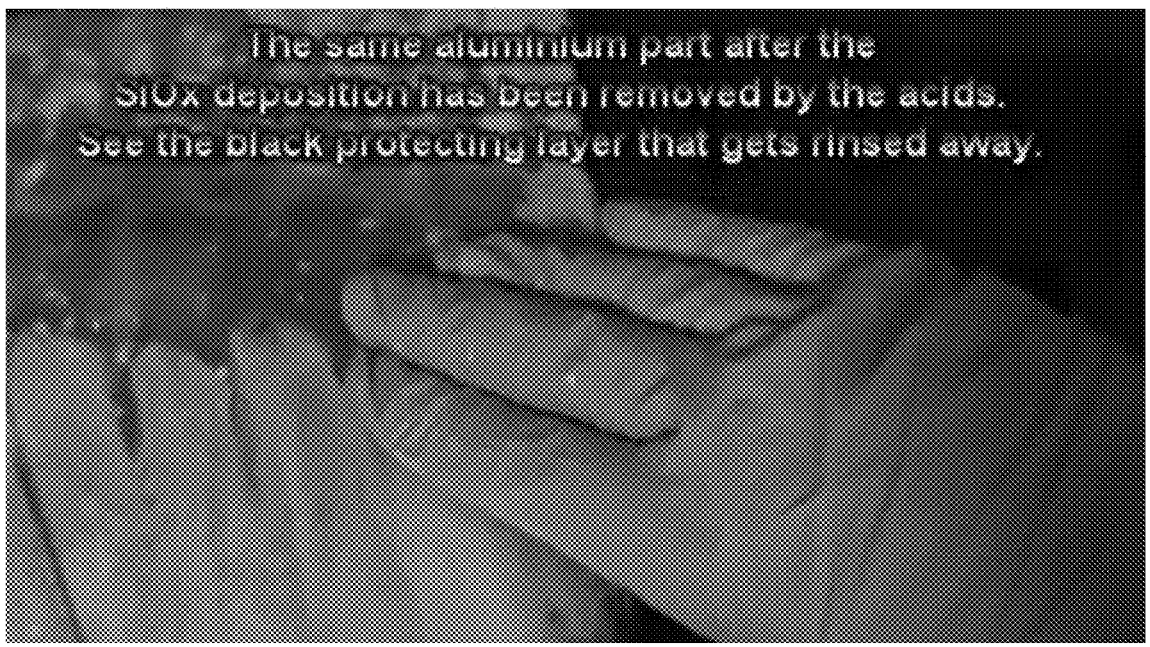

FIG. 20 depicts an aluminum part plated with SiOx deposits. In order to etch the $SiO_x$ the aluminum part was treated with DMF and a mixture of phosphoric acid and hydrofluoric acid (where the organo-amine is formed in-situ). A layer of black material was visible (FIG. 21) on the surface of the aluminum which was rinsed away with water.

Figure 22:
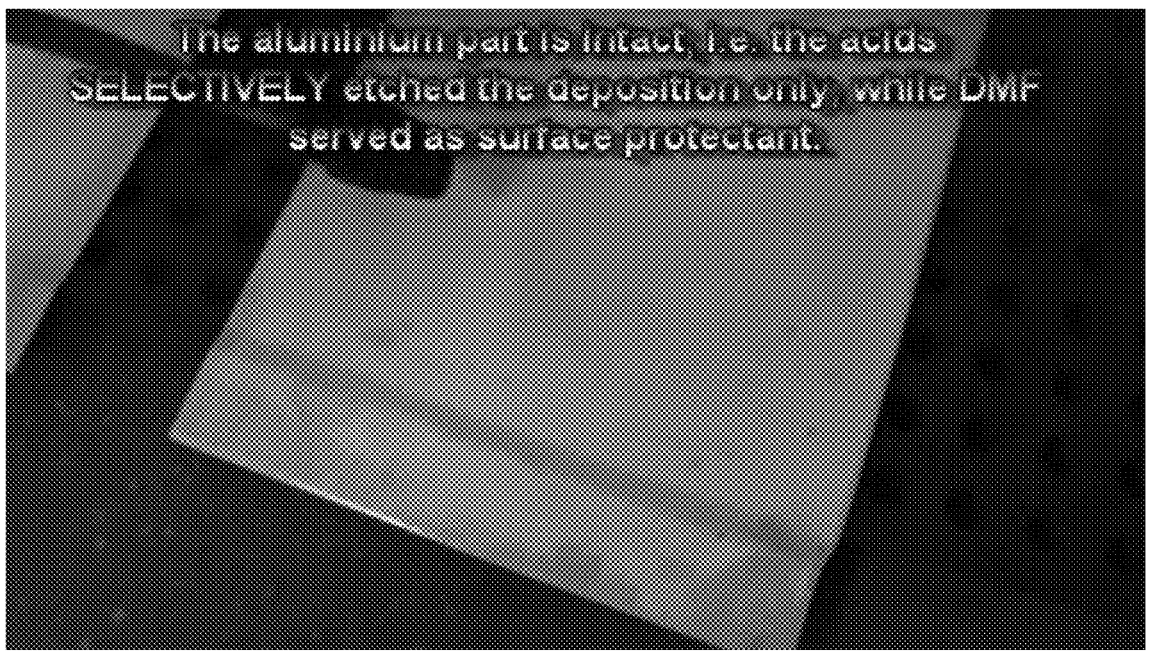

FIG. 22 depicts the aluminum part undamaged from this treatment method. Without wishing to be bound to any particular theory, applicant believes this black material is a protective layer that prevents damage to the aluminum part.

Figure 23:
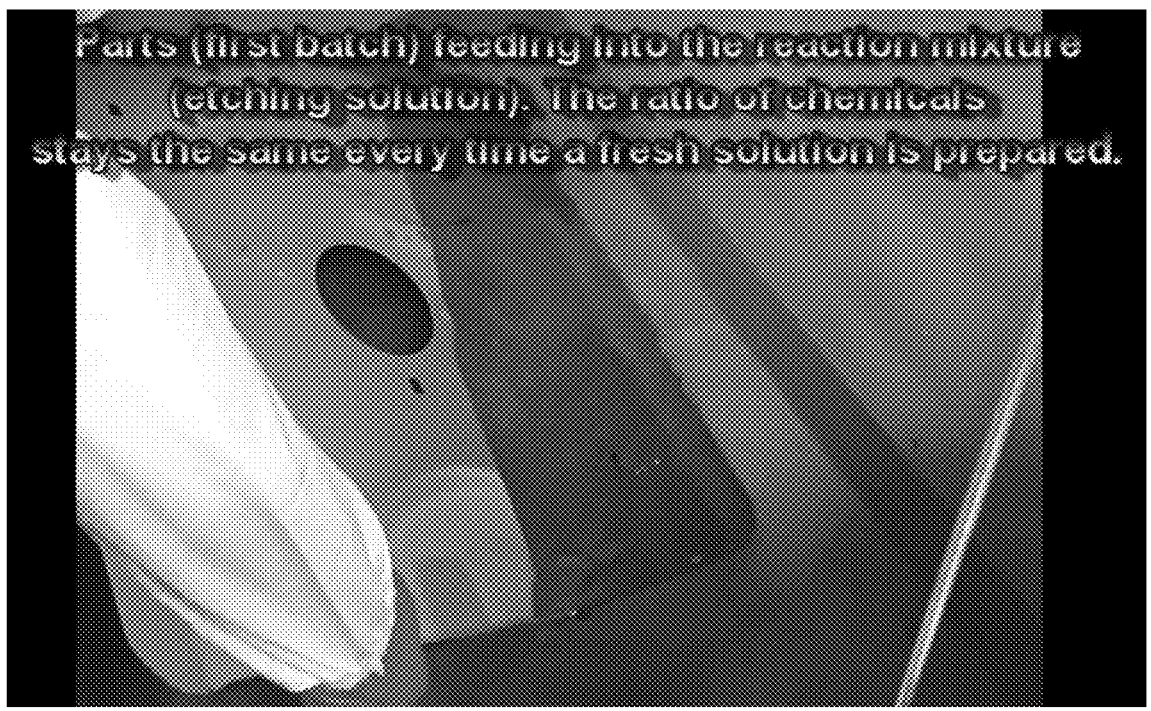
Figure 24:
Figure 25:
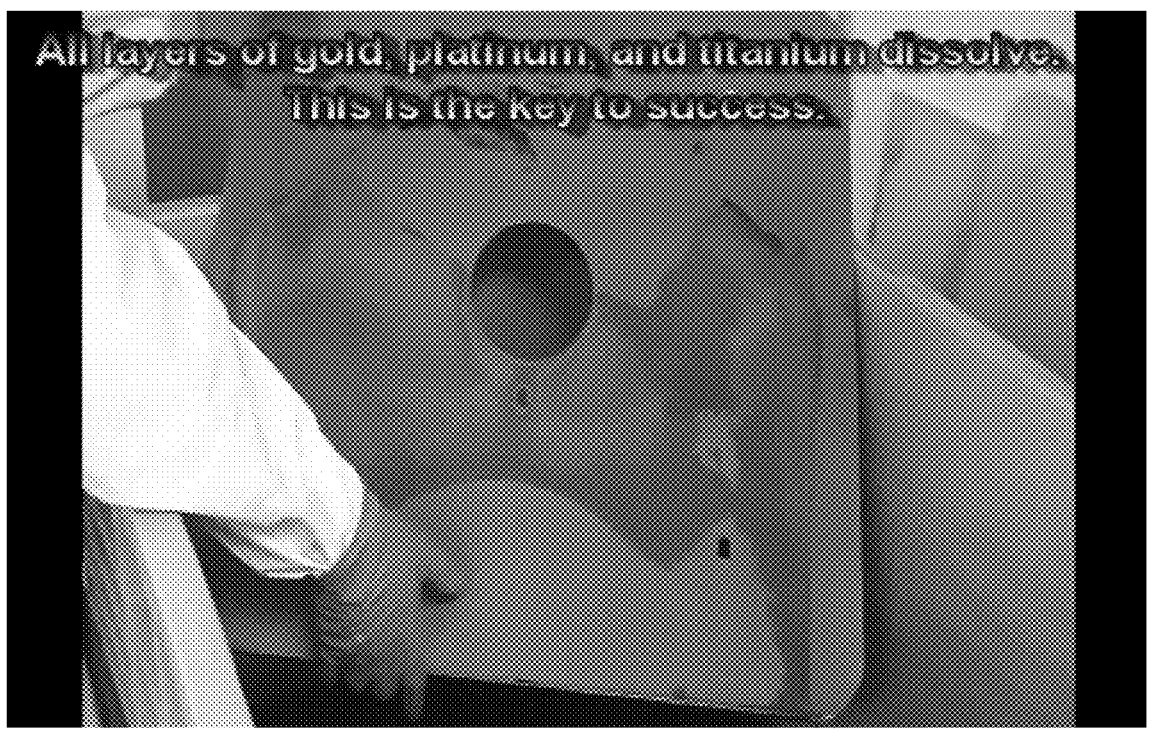
Figure 26:
Figure 27:
Figure 28:
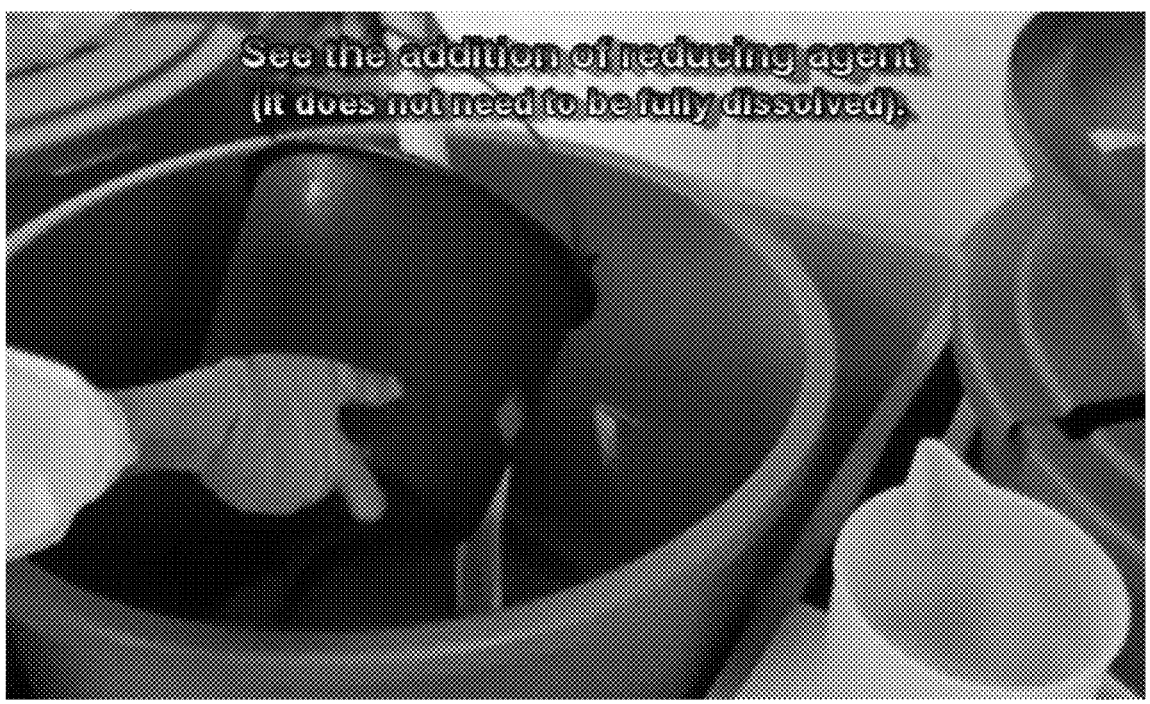
Figure 29:
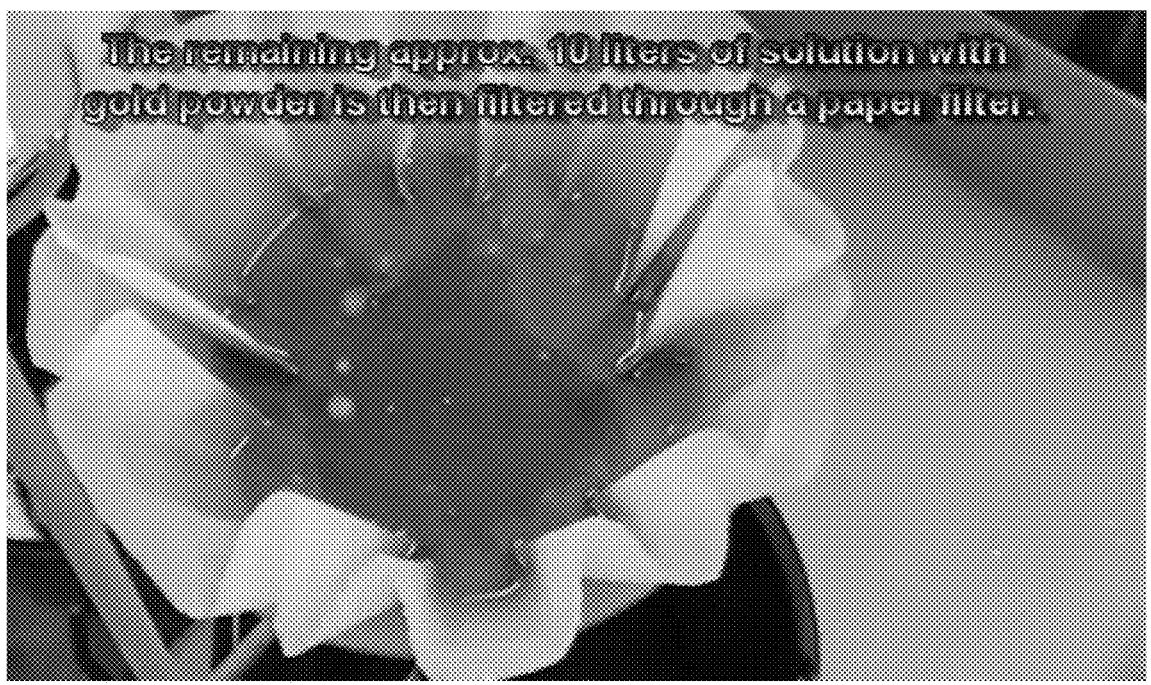
Figure 30:
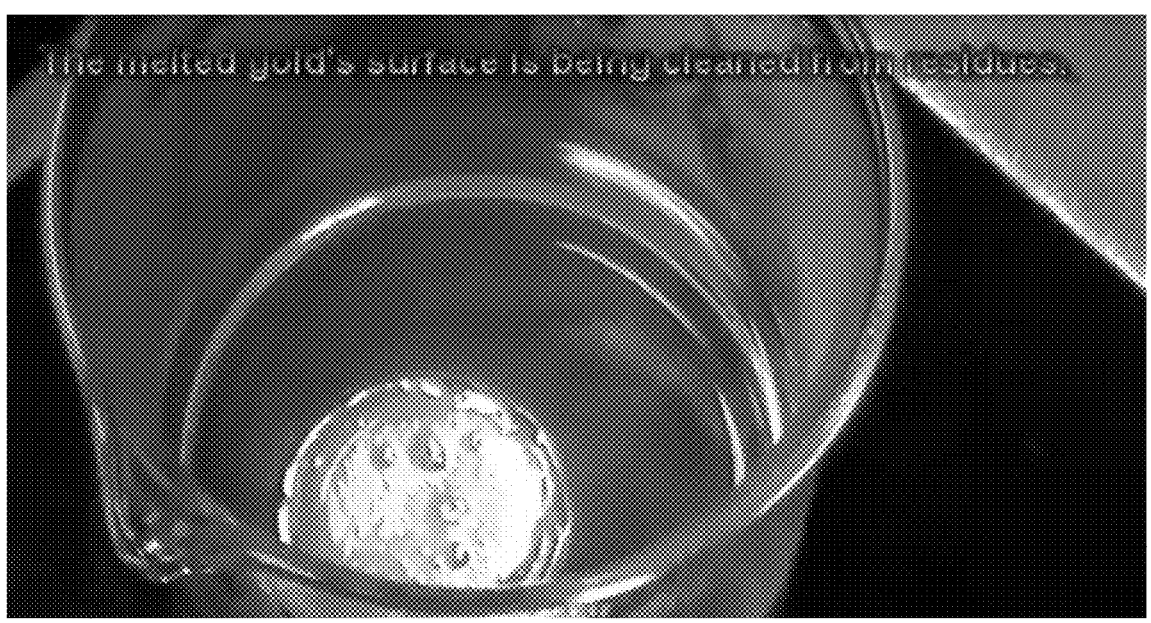
Figure 31:
Figure 32:
Figure 33:
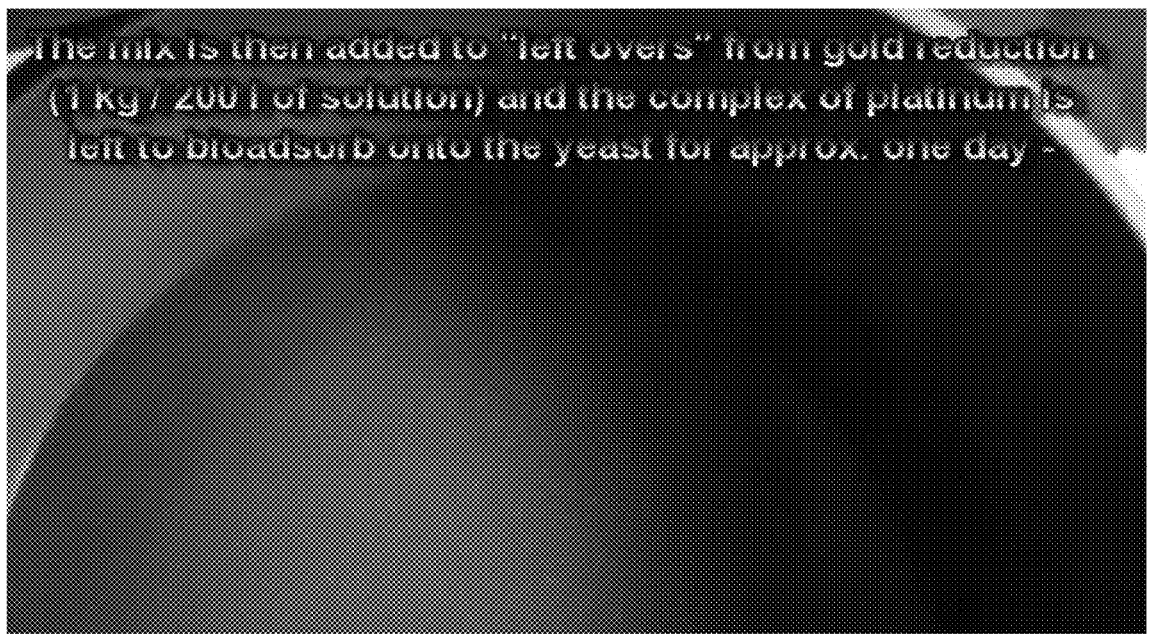
Figure 34:
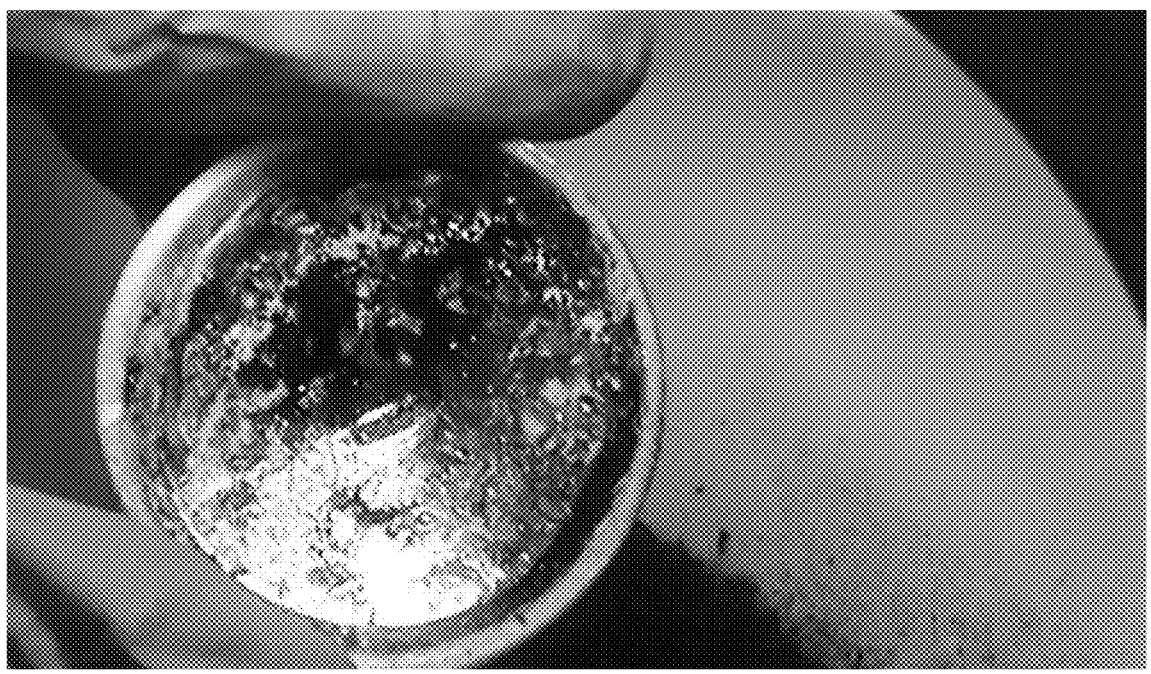

FIGS. 23 through 27 depict that a multilayer deposition of gold, platinum, titanium, and aluminum has been dissolved and removed from a stainless steel substrate using an organo-amine and nitric acid. FIG. 23 depicts parts feeding into the reaction mixture (etching solution). The ratio of chemicals stays the same every time a fresh solution is prepared. All 4 of the metals were successfully dissolved/removed from the stainless steel substrate without damage to the substrate (FIG. 27). Subsequently, the gold was separated from the platinum, titanium, and aluminum using gold reduction methods (FIG. 28; addition of the reducing agent;

FIG. 29; filtration of the solution with gold powder;

FIG. 30; cleaning the melted gold's surface from residues), and purified to 99.99% minimum purity (FIG. 31). Likewise, the platinum was separated from the titanium/aluminum solution using a biosorption method (for example, using yeast, FIGS. 32 through 34).

EXAMPLES

Example 1—Comparative

A sample of nitric acid (50%) and hydrochloric acid (31%) was prepared (1:1 volume ratio). Several pieces of copper wire were added to this solution. The copper wire completely dissolved within 40 minutes.

Example 2

A 20 mL sample of nitric acid (50%) and 20 mL hydrochloric acid (31%) was prepared in 200 mL N,N-dimethylformamide (DMF). Several pieces of copper wire were added to this solution. The copper wire showed no signs of dissolving within 40 minutes.

Example 3

A sample of 100 mL nitric acid (50%) and 300 mL hydrochloric acid (31%) was prepared in 4 L N,N-dimethylformamide (DMF). A solid piece of copper was coated with an alloy of gold, platinum and titanium. The copper was soaked in the sample solution for fourteen days at room temperature. The copper was removed from the solution and rinsed and manually washed to remove residual protective coating. The resulting copper appeared free of gold, platinum and titanium. There was no visible damage to the copper.

Example 4—Comparative

A sample of phosphoric acid (50%) and hydrofluoric acid (50%) was prepared. A piece of aluminum foil was added to this solution. The aluminum completely dissolved within 20 minutes.

Example 5

A sample of 25 mL phosphoric acid (50%) and 25 mL hydrofluoric acid (50%) was prepared in 400 mL N,N-dimethylformamide (DMF). A piece of aluminum foil was added to this solution. The aluminum showed no signs of dissolving within 20 minutes.

Example 6

A sample of 30 L phosphoric acid (50%) and 30 L hydrofluoric acid (50%) was prepared in 200 L N,N-dimethylformamide (DMF). A sheet of aluminum was coated with a SiOx deposition. The aluminum was soaked in the sample solution for ten days at room temperature. The aluminum was removed from the solution and rinsed and manually washed to remove residual protective coating. The resulting aluminum appeared free of the SiOx deposits. There was no visible damage to the aluminum.

Example 7

A gold-coated polyethylene terephthalate (PET) substrate (57.6 kg) was provided as a rolled thin-film. The film was sequentially rolled through the solution 50 L of nitric acid (50% diluted) and 3,5 kg of trimethylamine hydrochloride at a rate of about 9 meters per minute. The film was rinsed under a stream of water to remove trace acid. After processing, the gold-color was no longer visible on the film and the cleaning agents were gold-colored. There was no visible damage to the PET substrate.

Example 8

A provided stainless steel substrate coated with gold, platinum, titanium and aluminum (44 parts of different weights and sizes) was submerged into an etching mixture of 240 L of nitric acid (50%) and 16 kg of trimethylamine hydrochloride. All layers of gold, platinum, titanium, and aluminum dissolved in the etching mixture within 3 hours to 30 days depending on the thickness of the layers. There was no visible damage to the stainless steel parts. The solution was subsequently subjected to a reduction and refinement process that separated the gold from the other metals and refined the gold to 99.99% minimum purity. To the remaining solution containing platinum, titanium, and aluminum yeast (*Saccharomyces cerevisiae*) was added in the ratio of 1 kg of yeast per 200 liters of the solution. The organo-platinum complex was left to selectively bioadsorb onto the yeast for one day to successfully separate the platinum from the other metals. Then yeast/organo-platinum complex mix was then filtered off and burned at 1500° C. The remaining platinum oxide was isolated, pressed into pellets, and vacuum melted into platinum metal.

Example 9

The gold containing solutions of example 7 and 8 were subjected to a reduction and refinement protocol to provide 99.99% minimum purity gold—107.75 g of gold (187 g Au per 100 kg of the PET strip). The following describes the reduction and refinement protocol.

Example 10—Comparative

Three pieces of gold of similar shape, each 30 grams, were submerged into three etching mixtures. Each mixture consisted of 15 liters of nitric acid (50%) and (1) 1 kg of trimethylamine hydrochloride, (2) 1 kg of dimethylamine hydrochloride, (3) 1 kg of methylamine hydrochloride. The speed of gold dissolutions were measured over the period of two weeks and compared. The experiments suggested that the amine hydrochloride ability to dissolve and/or etch gold decreases in the trimethylamine hydrochloride>dimethylamine hydrochloride>methylamine hydrochloride order. The speeds were: 0.81 g>0.65 g>0.52 g of gold weight loss per day (room temperature, no stirring).

Example 11—Comparative

Five pieces of gold of similar shape, each 30 grams, were submerged into five etching mixtures. Each mixture consisted of 15 liters of nitric acid (50%) and (1) 1 kg of triethylamine hydrochloride, (2) 1 kg of diisopropylamine hydrochloride, (3) 1 kg of N-ethylcyclohexylamine hydrochloride, (4) 1 kg of dibutylamine hydrochloride and (5) 1 kg of trimethylamine hydrochloride. The speed of gold dissolutions were measured over the period of two weeks and compared. The experiments suggested that the amine hydrochloride ability to dissolve and/or etch gold decreases in the diisopropylamine hydrochloride>dibutylamine hydrochloride>triethylamine hydrochloride>N-ethylcyclohexylamine hydrochloride>trimethylamine hydrochloride order. The speeds were: 2.03 g>1.78 g>1.53 g>1.51 g>0.81 g of gold weight loss per day (room temperature, no stirring).

Example 12—Comparative

Two pieces of gold of similar shape, each 30 grams, were submerged into two etching mixtures. Each mixture consisted of 15 liters of nitric acid (50%) and (1) 1 kg of N-ethylcyclohexylamine hydrochloride, purchased commercially, and (2) 1 kg of N-ethylcyclohexylamine hydrochloride, prepared in situ by mixing appropriate amounts of N-ethylcyclohexylamine and hydrochloric acid, followed by adding the nitric acid. The speed of gold dissolutions were measured over the period of two weeks and compared. The speeds were: 1.51 g/1.50 g per day (room temperature, no stirring). The experiments suggested that there is no difference in ability to dissolve and/or etch gold between the commercial and in situ prepared chemical.

Reduction and Refinement of Gold Recovered From a Substrate

Once the gold has been removed from a substrate and is in solution as a complex, it must then be reduced through chemical treatment to form elemental gold. Reduction of the gold is accomplished as follows. Dilute the gold solution with between 60% to 80% by volume of the solution with distilled water. Then add a saturated aqueous solution of urea ($H_2NCONH_2$) to the diluted solution of gold (5 kg per 250 liters of solution) to destroy the nitric acid, $HNO_3$. Neutralization of the solution is determined by standard methods such as pH, titration, visual, or by other methods. Once the solution has been neutralized, hydroxylamine hydrochloride, $NH_2OH.HCl$, is added to the solution at room temperature. Addition of the hydroxylamine hydrochloride is done in 5 kg quantities until all of the gold has been precipitated from solution. Likewise, the hydroxylamine hydrochloride is added in 5 kg quantities so as to avoid any hazards in adding too much of the reducing agent too quickly. The presence of gold in the solution is tested on a small sample of solution using tin chloride, $SnCl_2$. If gold is still present, a dark brown/black precipitate will form with the addition of tin chloride. If no gold is present, the color of the solution will stay the same and be free of precipitate. Once all of the gold has been precipitated from solution, most of the solution is decanted from the gold precipitate, the gold is then filtered through a standard filter paper, and rinsed with distilled water during filtration. The recovered gold powder and filter paper are dried at 120-130 C for 4 hours in a standard convection oven. The gold powder is weighed after it is fully dried, and all gold is removed from the filter paper, using a wire brush if necessary to get as much gold as possible from the paper. The gold powder is now transferred to a melting crucible, mixed with anhydrous sodium tetraborate ($Na_2B_4O_7$), two teaspoons of borax per 200 grams of gold powder, and heated to 1180° C. for 5 to 10 minutes. The crucible is cooled in water and destroyed so as to remove the gold. The recovered gold "Roundlet" is boiled in nitric acid (12 M, diluted by 50%, 2 hours minimum), rinsed with distilled water, air dried, weighed, rinsed with isopropyl alcohol, and air dried a final. The gold is now 99.99% minimum purity.

The invention claimed is:

1. A process for obtaining platinum from a substrate with depositions of gold and platinum, comprising the following steps:
    (a) treating the substrate with an organo amine protectant component ("P") and an inorganic active component ("A") or treating with a complexing component ("C") and an "A", thereby forming a solution containing organo-metallic complexes of gold and platinum,
    (b) subjecting the solution resulting from said treatment, to a reduction and refinement process to isolate the gold from the complexes,
    (c) adding yeast to a remaining solution;
    (d) isolating a resulting organo-platinum yeast complex by filtration and burning it to obtain platinum oxide, and
    (e) reducing the platinum oxide to platinum metal.

2. The method of claim 1, wherein the substrate comprises at least one material selected from the group consisting of aluminum, copper, steel, stainless steel, glass, titanium, aluminum alloys, copper alloys, steel alloys, stainless steel alloys, titanium alloys, graphite, carbon fiber, ceramic, fused silica, quartz, polymers, ores and blasting media selected from the group consisting of: corundum, sand, corn cob, plastic abrasives, silicon carbide, pumice, steel grit, steel shot, walnut shells, soda and glass beads.

* * * * *